Dec. 16, 1924.                                          1,519,330
                     W. T. POWELL
                 AUTOMATIC TELEPHONE SYSTEM
                  Filed Feb. 11, 1921          5 Sheets-Sheet 5

FIG.5

INVENTOR
WINFRED T. POWELL
BY D. Clyde Jones
ATTORNEY

Patented Dec. 16, 1924.

1,519,330

UNITED STATES PATENT OFFICE.

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

AUTOMATIC TELEPHONE SYSTEM.

Application filed February 11, 1921. Serial No. 444,243.

*To all whom it may concern:*

Be it known that I, WINFRED T. POWELL, a citizen of the United States, residing at Rochester, in the county of Monroe and State of New York, have invented certain new and useful Improvements in Automatic Telephone Systems, of which the following is a full, clear, concise, and exact description.

This invention relates to telephone systems and more particularly to automatic telephone systems.

The present invention has for its purpose the provision of novel means for establishing impulse circuits and novel means for automatically adjusting numerical switches over such impulse circuits. Other features will appear in the detailed description and claims.

Figure 1:
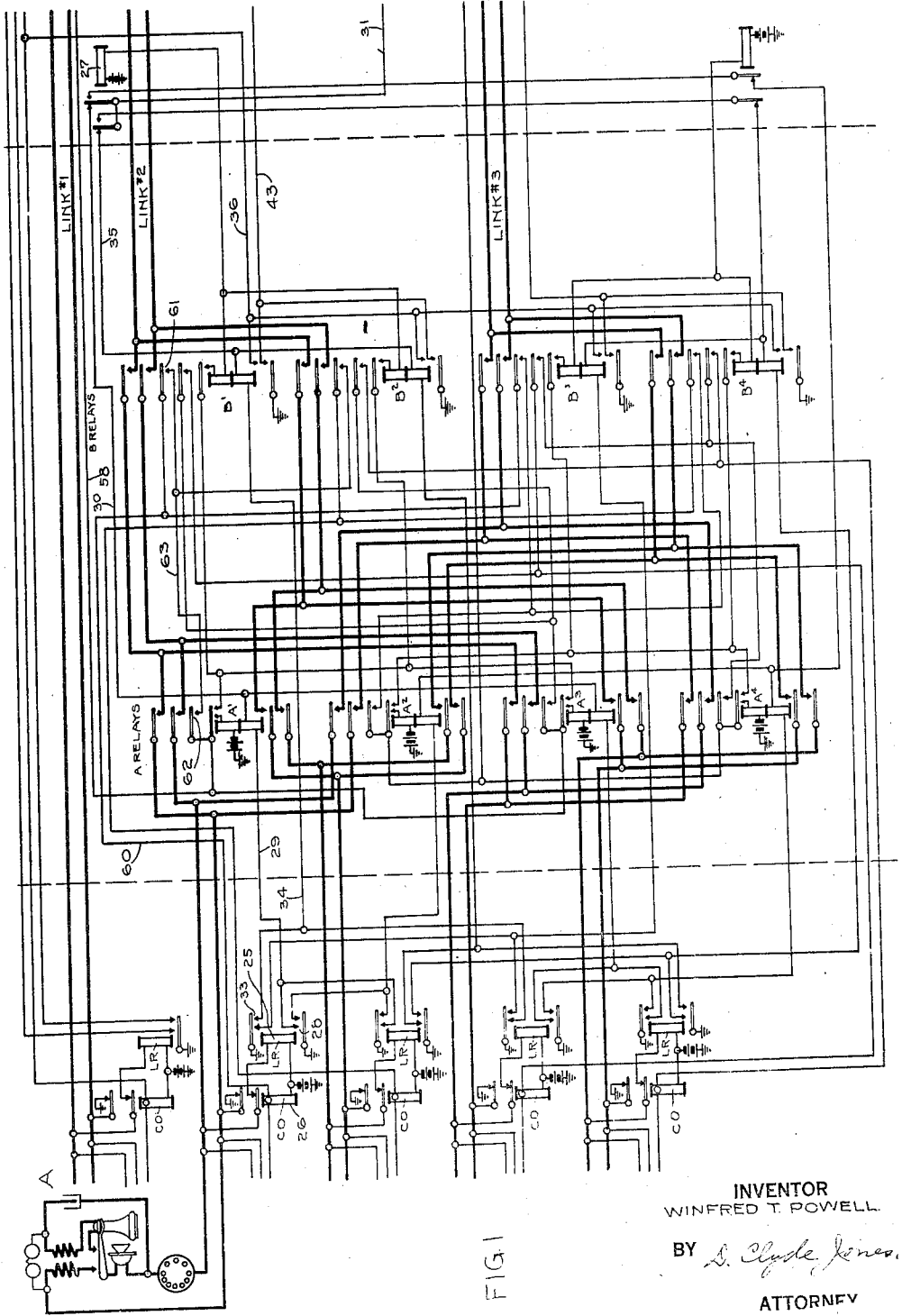
Figure 2:
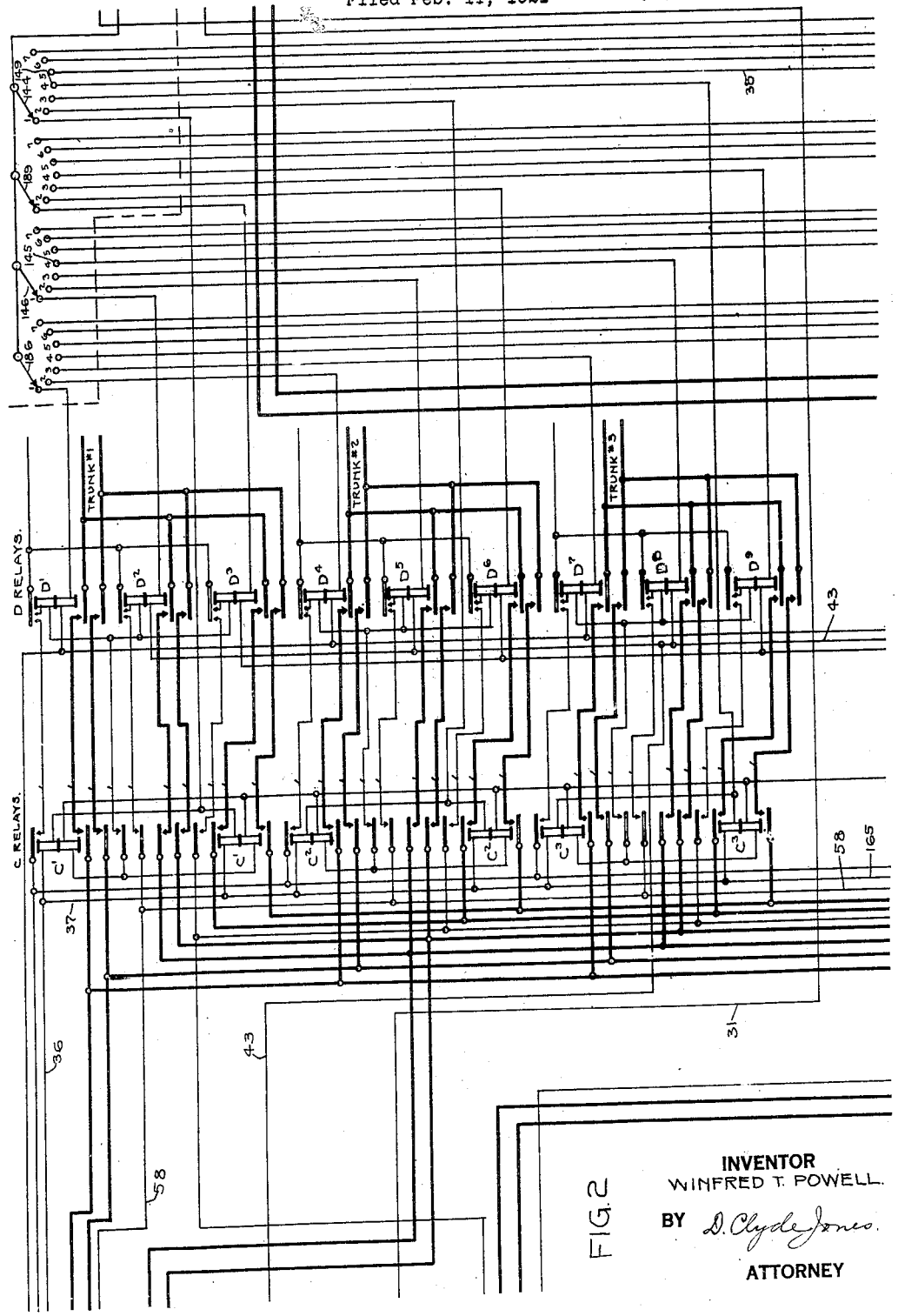
Figure 3:
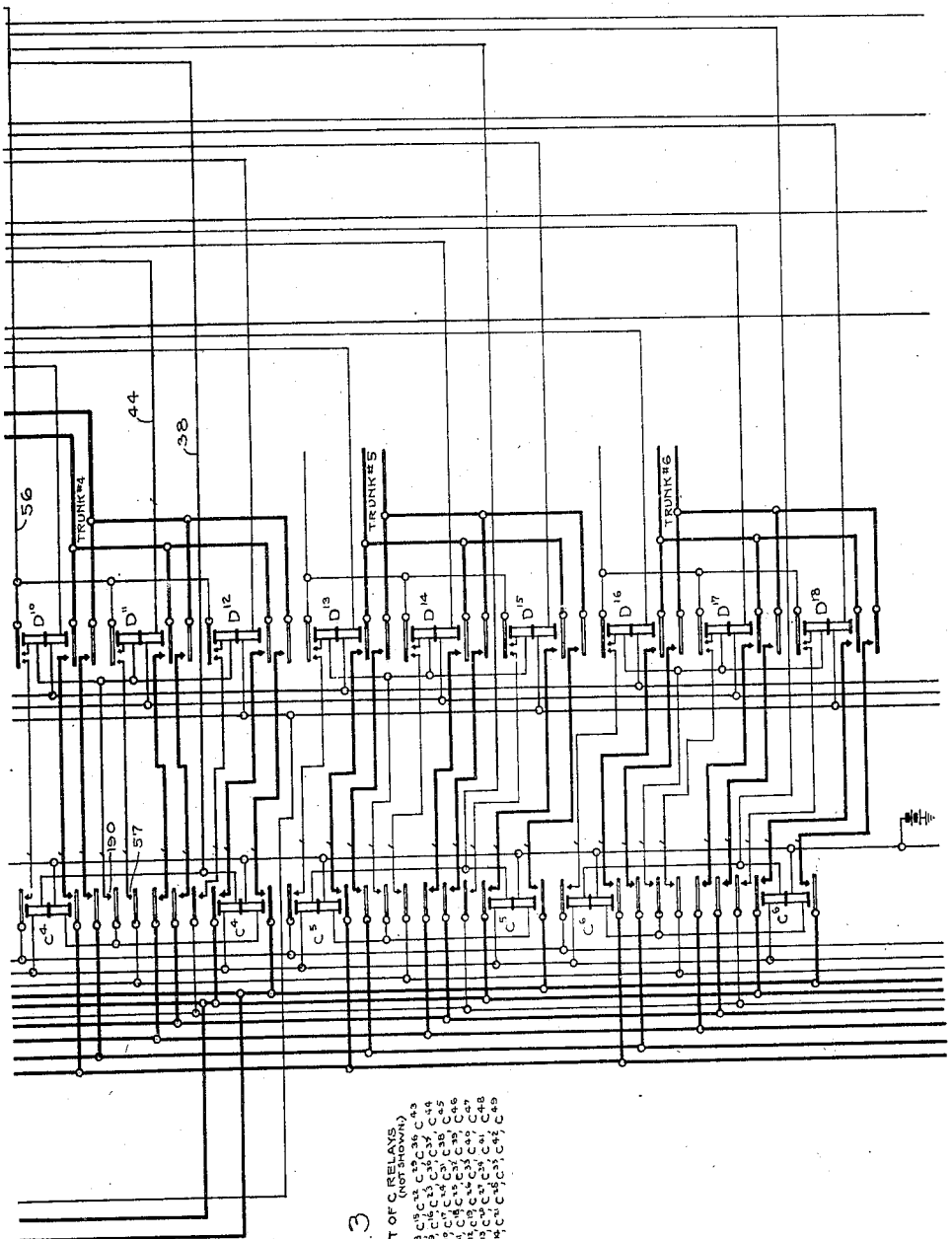
Figure 4:
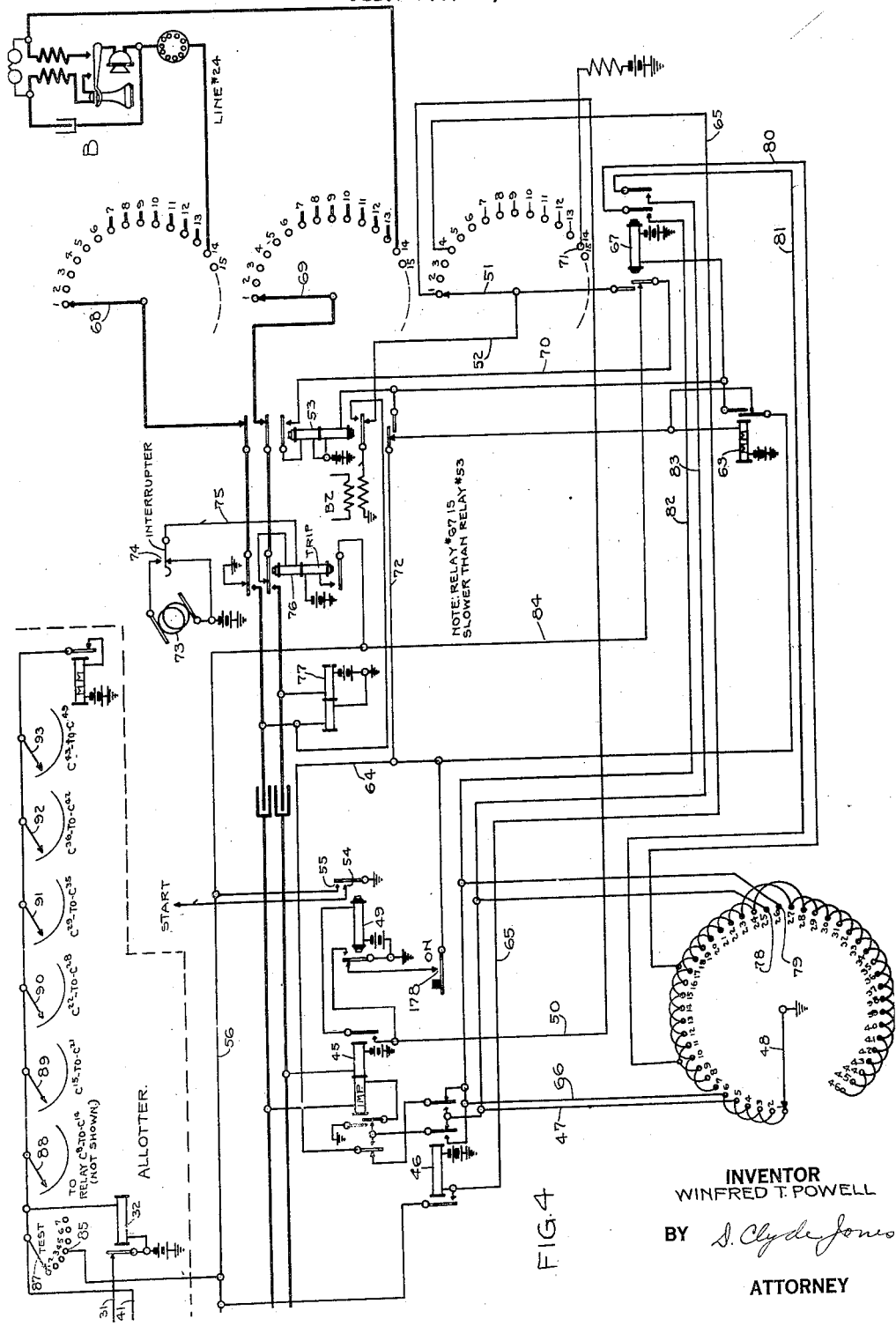

The drawings, with Figs. 1, 2 and 4 arranged side by side in the order named and with Fig. 3 placed below Fig. 2, diagrammatically represent a portion of a telephone system incorporating the present invention. That portion of the drawing appearing at the left of the dotted line in Fig. 1 represents one substation circuit of a telephone line as well as an abbreviated disclosure of four other telephone lines. Between the dotted lines of this figure there appears a group of relays referred to as linking relays which operate to extend a calling line to an idle link circuit. It will be noted at this point that the first telephone line at the top of Fig. 1 has provided a link circuit for its individual use, whereas the four other telephone lines represented are arranged to select any one of two link circuits. In Figs. 2 and 3 there are represented two groups of relays designated trunk selecting relays which operate to extend a link circuit to an allotted trunk circuit. At the upper right-hand corner of Fig. 2 and at the upper left-hand corner of Fig. 4 there is represented a multi-brush switch herein designated an allotter having brushes 186, 146, 189, 144, 87, 88, 89, 90, 91, 92 and 93 which functions to pre-select an idle trunk circuit. In Fig. 4 there is represented certain operating circuits of a numerical switch which is individual to a trunk circuit and is arranged to be directively operated under subscriber's control to select any one of the subscriber's lines terminating thereat.

Fig. 5 diagrammatically represents a modified form of numerical or connector switch and the circuits thereof are arranged to replace those of the numerical switch of Fig. 4. It will be noted in the upper left-hand corner of Fig. 5 and in the upper right-hand corner of Fig. 2 there is diagrammatically represented a complete allotter switch for one group of trunks.

The telephone lines, links and trunks are arranged in the following manner, although the invention does not reside in this grouping, and may be variously changed without departing from the spirit of the present invention. The system as shown in Figs. 1, 2, 3 and 4 is arranged for a maximum number of 35 lines in each group. Each of these groups is further sub-divided into a unit having five telephone lines. One of these lines, as previously indicated, has for its individual use a single link circuit, whereas the remaining four lines of the sub-group are arranged to be connected with any one of two links through the agency of four relays herein designated A relays and four relays herein referred to as the B relays. It will thus be seen that these 35 lines are extended through the agency of 21 link circuits. These link circuits have access to seven trunk circuits each of which terminates in a numerical switch, which in the case of the present disclosure is a connector switch although in a larger system it will be understood that the numerical switch will be of the so-called selector type. For the purpose of connecting the 21 links to the seven trunk circuits there are provided 49 relays that are referred to as the so-called C relays and 21 relays herein referred to as the D relays. Only a portion of these various groups of relays have been shown but from the notes appearing on the drawing it will be readily understood how these relays are disposed for each group of 35 lines. It will, of course, be understood that if the system has more than 35 lines that there will be a plurality of such groups, with a corresponding increase in the number of links and trunk circuits.

The following chart indicates the various positions to which the connector switch of Fig. 4 is moved in response to each series of impulses.

| Sw. pos. stopping point | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| For # dialed | | | | | 1 | 2 | | | | | | | | | | |
| # connected | | | | | | | 11 21 | 12 22 | | 13 23 | | 14 24 | | 15 25 | | |
| Trk. connections | | | | | | | | | | | | | | | | |

Continued.

| Sw. pos. stopping point | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| For # dialed | | | | | | | | | 10 | 20 | | | | | |
| # connected | 16 26 | | 17 27 | | 18 28 | | 19 | | | | 101 201 | | 102 202 | | 103 |
| Trk. connections | | | | | | | | | | | | | | | |

Continued.

| Sw. pos. stopping point | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|
| For # dialed | | | | | | | | | | | | | | | |
| # connected | 203 | 104 204 | 105 205 | 106 206 | 107 207 | 108 208 | 109 | | | | | | | | |
| Trk. connections | | | | | | | | | | | | | 100 209 | | 200 |

It is believed that the invention will best be understood by describing the method of establishing a telephone connection from a calling subscriber indicated at A to a called substation indicated at B. When the calling subscriber at A removes his receiver from its switch hook, the line relay individual to his line is energized in a circuit extending from grounded battery, winding of this relay, inner back contact and armature of cut-off relay 26, over the upper side of the calling subscriber's line and substation circuits in series, over the lower side of the calling line, upper armature and back contact of cut-off relay, to ground. The line relay is energized in this circuit and closes its various contacts.

Let it be assumed that link circuit #2 is idle under which assumption the guarding relay 27 of this link will be inert as a result of which a circuit is closed from ground, armature and contact 28 of the line relay, conductor 29, lower winding of relay A', conductor 30, inner back contact and armature of relay 27, conductor 31, back contact and armature of relay 32, to grounded battery. Relay A' is energized in this circuit and as soon as the trunk circuit is seized, a holding circuit will be completed for it as will presently be described. Also at the upper armature and contact 33 a circuit is closed from ground, conductor 34, lower winding of relay B', conductor 35, outer back contact and armature of relay 27, conductor 31, to grounded battery at the armature of relay 32. The operation of the relays A' and B' is effective to connect the line to link #2. When the B' relay operates it closes a circuit for actuating the pair of trunking relays C$^4$ over a circuit extending from ground at the inner lower armature and front contact of relay B', conductors 36 and 37, upper windings of the two relays C$^4$ in multiple, conductor 38, contact 149 and allotter brush 144, conductor 41, winding of relay 32, to grounded battery. The relays C$^4$ will be energized in this circuit and presently a locking circuit will be closed for them. Also at the lower armature and front contact of relay B' a circuit is closed from ground, over conductor 43, lower winding of relay D$^{11}$, conductor 44, contact 145 and brush 146 of the allotter, over conductor 41, to grounded battery.

With the relays A', B', C$^4$ and D$^{11}$ operated, an impulse circuit is extended from the subscriber's substation including both sides of the calling line in series as well as both sides of the link and trunk circuits to the windings of the impulse relay 45. The right-hand winding of this relay is connected to grounded battery while the other side of this impulse circuit extends from the left-hand winding of this relay, through its continuity spring and contact, inner armature and back contact of relay 46, conductor 47, connector brush 48 in its first position, to ground. The impulse relay 45 is energized in this circuit and at its inner left-hand armature and continuity spring closes a circuit to ground, independent of brush 48 of the connector. With the impulse relay 45 operated, a circuit is closed to the slow releasing relay 49, from grounded battery, winding of this relay, right-hand armature and front contact of impulse relay 45, conductor 50, connector brush 51 in its first position, conductor 52, inner lower back contact and armature of relay 53, through the secondary winding of the induction coil, to ground. The relay 49 is operated in this circuit and at its contact 54 closes a start circuit for initiating the operation of the generator and busy tone device. At the contact 55 of this relay, a guarding potential for this trunk is applied to its terminal 85 at the allotter and a holding circuit is completed over conductor 56, innermost upper front contact and armature of relay D[11], front contact 57, and armature of relay C[4], conductor 58, innermost upper armature, front contact and upper winding of relay A', to grounded battery. A multiple circuit of that last described extends through the armature and front contact of relay A', innermost upper armature, front contact and winding of relay B', winding of relay 27, to grounded battery. The cut-off relay 26 is also energized in multiple of this circuit which extends from grounded battery, winding of this relay, conductor 60, armature and contact 61 of relay B', conductor 63, contact 62 and armature of relay A', over conductor 58, to ground at the front contact and armature of relay 49. The operation of the cut-off relay disconnects the line relay 25 from its line but the linking relays are held operated independent thereof. At this time locking circuits are closed for the two relays C[4] and D[11] which circuits may be traced from grounded battery, appearing at the lower part of Fig. 3, through the two lower windings of the relays C[4], armature and contact 190, upper winding, front contact and armature of relay D[11], over conductor 56, to ground. It will thus be seen that the linking and trunk switching relays that have been operated are locked in this condition over the locking circuit, just described.

Since the calling line has thus been extended over an idle link and a preselected trunk circuit to the connector switch, the impulse relay 45 is operated, as previously described. As a result of this operation the motor magnet 63 is energized in a circuit traced from grounded battery, winding of this magnet, back contact of relay 53, conductor 64, outer armature and front contact of impulse relay 45, inner armature and back contact of relay 46, conductor 47, connector brush 48 in its first position, to ground. On the operation of the motor magnet 63 the relays 53 and 67 are energized in multiple circuits, relay 53 being operated from grounded battery, its lower winding, armature and continuity spring of motor magnet 63, conductor 64, to ground at connector brush 48 in its first position. Similarly the relay 67 is operated in a circuit extending from grounded battery, its winding, armature and continuity spring of motor magnet 63, over the circuit previously described as extending to ground at the first position of connector brush 48. The slow releasing relays 53 and 67 are operated in this circuit and the first mentioned relay opens the operating circuit of the motor magnet causing this magnet to advance the connector switch brushes 48, 68, 69 and 51 into their second position which opens the circuits of relays 53 and 67.

In the interval before the subscriber dials the first series of impluses corresponding to the first digit of the wanted number the slow releasing relays 53 and 67 deenergize. The subscriber now transmits impulses corresponding to the first digit of the wanted number which in the case assumed is "2" and in response thereto the impulse relay retracts its armature and thereby closes a circuit for the motor magnet 63 from grounded battery, its winding, back contact and continuity spring of relay 53, conductor 72, armature and back contact of impulse relay 45, outer armature and back contact of relay 46, conductor 66, connector brush 48 in its second position, to ground. The motor magnet is operated in this circuit and immediately interrupts this circuit by again operating relay 53 and thereby advances the connector switch brushes into their third position. The relays 53 and 67 are operated in the manner previously described and remain actuated during the remainder of the series of impulses. At the close of this first impulse the impulse relay 45 is energized over the impulse circuit previously described and through its left-hand winding, continuity spring and back contact, inner armature and back contact of relay 46, conductor 47, connector brush 48 in its third position, to ground. The impulse relay, as in the previous case, is energized and locks itself operated through its continuity spring and armature to ground. With the impulse relay 45 again operated, the motor magnet 63 is actuated in a circuit extending from grounded battery, its winding, back contact and continuity spring, conductor 64, outer armature and front contact of impulse relay 45, inner armature and back contact of relay 46, conductor 47, connector brush 48 in its third position, to ground. The motor magnet is energized in this circuit but again interrupts its own circuit to advance the connector switch brushes now into their fourth position. In response to the second and last impulse of the first series of impulses the relay 45 again retracts its armatures and thereby again completes the circuit for the motor magnet from grounded battery, winding of this magnet, its back contact and continuity spring, conductor 64, armature and back contact of relay 45, armature and back contact of relay 46, conductor 66, connector brush 48 in its fourth position, to ground. The motor magnet again interrupts its own circuit to advance the connector switch brushes into their fifth position and at the close of this second impulse the impulse relay 45 is again actuated and the motor magnet 63 advances the brushes of the connector switch into their sixth position.

In response to the last series of impulses which in the case assumed are four in number, the motor magnet 63 again continues to advance the brushes of the connector in the manner previously described, that is, the response to each impulse by which is meant the attraction and subsequent retraction of the armatures of the impulse relay. The motor magnet 63 advances the brushes of the connector two steps. The method of operating the connector is the same as in the case of the first series of impulses except that after the sixth position of the connector is past the motor magnet is controlled over circuits 80, 81, 82 and 83 instead of conductors 47 and 66. It will thus be seen that, since there are four impulses in the last series and, since the connector switch was standing in position 6 at the close of the first series of impulses, these brushes will be advanced to the 14th set of contacts which is the set of contacts assigned to line 24.

It will, of course, be understood that the slow releasing relays 53 and 67 will be energized and remain operated over the circuit previously mentioned during the transmission of each series of impulses. Let it be assumed that the wanted line is engaged at this time under which assumption its test terminal will be characterized by the presence of reduced battery potential, so that the relay 53 is locked operated in a circuit traceable from grounded battery, its upper winding, innermost armature and front contact, conductor 70, continuity spring and left-hand armature of relay 67, connector brush 51 in its 14th position, test terminal 71 of the wanted line and through a multipled test terminal thereof and the remainder of the circuit completed at the connector which has previously seized the wanted line, that is, through a test brush similar to 51, a conductor corresponding to 52, inner back contact and armature of a relay similar to 53, secondary winding of the induction coil, to ground. When relay 67 deenergizes, the locking circuit of relay 53 is extended through the continuity spring and contact of relay 67 to conductor 84 and thence to the locking conductor 56. With relay 53 thus locked operated the connector brushes 68 and 69 are disconnected from the selected trunk while at the inner lower armature and front contact of relay 53 a busy tone is transmitted over conductor 62 and over the upper side of the extended connection to the calling line.

Let it now be assumed that the wanted line is idle, under which assumption full battery potential will be present on the test terminal 71 of the called line so that the relay 53 will be permitted to deenergize and thereby connect the selected trunk circuit to the connector brushes 68 and 69. It will also be seen that the busy tone is prevented from reaching the calling line. Also when relay 53 deenergizes a signalling circuit is completed, including the ringing generator 73, brush 74 of the ringing interrupter, conductor 75, upper winding of the trip relay 76, its inner back contact and armature, middle armature and back contact of relay 53, connector brush 69, through the lower side of the called line and through the called line ringer, over the upper side of the called line, connector brush 68, uppermost back contact and armature of relay 53, uppermost armature and back contact of trip relay 76, to ground. Over this circuit ringing current is intermittently applied until the called party responds, at which time the trip relay 76 is energized and locks itself operated in a circuit completed from grounded battery, through its lower winding, front contact and armature, to the holding conductor 56. With relay 76 operated the talking conductors are extended from the calling substation to the called substation.

Talking battery is suppled for the calling party through the windings of the impulse relay 45, while talking battery for the called party is supplied through the windings of the impedance coil 77.

At the termination of the call or when the call is abandoned by the calling subscriber replacing his receiver on its switch hook, the impulse relay has its operating circuit interrupted and deenergizes to open the circuit which has been maintaining the slow releasing relay 49 operated. Shortly after the opening of its circuit the slow releasing relay 49 retracts its armatures and thereby closes a circuit from ground, its left-hand armature and back contact, off-normal contact 178, continuity spring, back contact and winding of motor magnet 63, to grounded battery. Under the control of this circuit the motor magnet is automatically operated to advance the connector switch brushes to their normal position at which time the off-normal contacts 178 are opened and the operating circuit of the motor magnet thereby is broken. Also when the slow releasing relay 49 retracts its armatures, it removes ground at its contacts 55 from the holding conductor 56 which thereby permits the operated linking and trunk selecting relays to release and also releases the cut-off relay of the calling line. The apparatus is now in condition to operate on a succeeding call.

In the event that the calling subscriber operates his dial sender to transmit one impulse corresponding to the numeral "1" for the first digit then the connector switch will be advanced to its fourth position where a circuit is closed for energizing the relay 46, this circuit extending from grounded battery, winding of this relay, conductor 65, connector brush 51 in its fourth position, conductor 52, inner back contact and armature of relay 53, secondary winding of the induction coil to ground. Relay 46 is operated in this circuit and locks itself actuated through its left-hand front contact and armature to ground over the holding conductor 56. Also with the relay 46 operated, a circuit is closed for the motor magnet 63 from grounded battery, its winding, back contact and continuity spring, conductor 64, outer armature and front contact of relay 45, inner armature and front contact of relay 46, conductor 66, connector brush 48 in its fourth position, to ground. The motor magnet 63 interrupts its own circuit and thus advances the connector switch brushes into their fifth position. It will be seen that the relay 46 interchanges the normal connections of the two control conductors 47 and 66 forming parts of the impulse circuit so that when the next series of impulses are transmitted they will be effective to stop the switch on points having an odd designation whereas without the relay 46 operated the connector switch brushes are advanced to sets of contacts having an even designation.

It will be noted that the contacts 78 and 79 which co-operate with the connector switch brush 48 are not connected to any subscriber's line since they are necessary as stopping positions for the connector switch after it has received the second series of impulses corresponding to the second digit of a three digit number. Without the provision of these so-called stopping points or in other words if the subscriber's lines had been connected to the 25th and 26th set of contacts corresponding to the sets 78 and 79 there would be danger that the subscribers on these lines might be falsely signaled.

As this system has been arranged to provide service for 35 lines by using 43 of the sets of contacts on the switch, the remaining three sets of contacts corresponding to the 44th, 45th and 46th set of contacts of the switch and which are reached by transmitting three series of impulses to the switch may be used for seizing trunks to an operator's position.

If any one of these trunks is again seized after its use, before its switch gets into its normal position, relay 49 will not be operated because its operating circuit is completed through brush 48 of the connector switch in its first position.

In the modification shown in Fig. 5 a connector switch in which 200 lines terminate is provided. This switch may be of a type similar to that disclosed in the patent to Keith, Erickson & Erickson #815,176 issued March 13, 1906, when modified by being provided with 21 vertical ratchet teeth and one additional rotary ratchet tooth. It will also be necessary to provide 200 tip terminals and 200 ring terminals instead of the two sets of 100 each which are now commonly in use. Similarly there will be 200 test terminals and also 200 additional terminals for controlling the circuits of the switch. It will also be noted by reference to the drawing that a vertical brush and a rotary brush, in addition to those normally provided, are necessary.

With this brief description of the apparatus employed, it is believed that the invention will best be understood by describing the method of establishing a telephone connection to a wanted telephone line such as #124. It will be assumed in this description that the calling line which may be represented by the substation A of Fig. 1 has been extended over one or more link circuits, such as shown in Figs. 2 and 3 to the conductors 100 and 101 of a selected trunk terminating in the idle connector switch of Fig. 5, through which the wanted line can be reached. As soon as this trunk has been seized, the impulse relay 102 is energized in a circuit extending from grounded battery, right-hand winding of this relay, conductor 101 of the selected trunk and through the remainder of the established connection to the calling substation and over the upper side of this connection and trunk conductor 100, through the left-hand winding of relay 102, its continuity spring and back contact, inner armature and back contact of relay 103, conductors 104 and 105, vertical brush 106 in its normal position, side switch wiper 107 in its first position, to ground. The impulse relay 102 is energized in this circuit and at its left-hand armature and continuity spring is locked operated until the subscriber's line is opened as by the operation of his dial sender. At the right-hand armature and front contact of impulse relay 102 an energizing circuit is closed for the slow releasing relay 108 and this relay applies ground to the holding conductor 56 as long as the connection remains established. At the outer left-hand armature and front contact of the impulse relay, a circuit is closed for the change-over relay 109, from grounded battery, winding of this relay, left-hand back contact and armature of the test relay 110, outer armature and front contact of the impulse relay, inner armature and back contact of the relay 103, conductor 104 to ground at side switch wiper 107, as previously described. The change-over relay 109 attracts its armatures and at its inner armature and front contact closes an energizing circuit for the primary motor magnet 111 which is traceable from grounded battery, winding of this magnet, its back contact and armature, side switch wiper 112 in its first position, front contact and armature of change-over relay to ground at side switch wiper 107, in a circuit in multiple of that just described for the change-over relay. At the outer armature and continuity spring of the change-over relay a circuit is closed from ground, through the armature and back contact of relay 113, winding of the escape magnet 114 and resistance, to grounded battery. The primary motor magnet 111 when energized interrupts its own circuit and advances the brushes of the connector switch one vertical step. This operation interrupts the operating circuit of the primary motor magnet 111 and of the change-over relay 109, causing this last named relay to deenergize after a short interval, to interrupt the operating circuit of the escape magnet 114 which deenergizes and moves its side switch wipers into their second position.

As soon as the connector switch has been advanced one step it closes its primary off-normal contacts and thereby completes an energizing circuit for the relay 115 which circuit is completed from grounded battery, left-hand winding of this relay, outer armature and back contact of relay 117, primary off-normal contacts 118, right-hand back contact and continuity spring of relay 117, to ground. The relay 115 is operated in this circuit and short-circuits the interrupting contacts of the secondary motor magnet 119. This assures that the motor magnet will advance the connector brushes only one step at a time in response to each impulse, whereas in the later operation of this magnet it is necessary for it to advance the connector brushes two steps in response to each impulse. This latter feature will be further pointed out in this description. The impulse circuit for the impulse relay is now completed through its left-hand winding, primary off-normal contacts 150, back contacts and armature of relay 117, side switch wiper 107, to ground. The previously described operations have been effected in response to the seizure of the selected trunk. The remaining selective operations will be under subscriber's control.

The subscriber at substation A now operates his dial sender to transmit the first of three series of impulses corresponding to the wanted subscriber's designation which it will be assumed is #124. The subscriber operates his dial sender to transmit one impulse corresponding to digit "1" and in response to this impulse relay 102 retracts its armatures whereupon a circuit is now closed for the change-over relay 109 extending from grounded battery, winding of this relay, back contact and armature of test relay 110, outermost armature and back contact of relay 102, inner front contact and armature of relay 115, to ground. Change-over relay 109 attracts its armatures and completes a circuit for the escape magnet, as previously described. Also at its inner armature and front contact it closes a circuit in multiple with its own for the secondary motor magnet 119, extending from grounded battery, its winding, outer front contact and armature of relay 115, side switch wiper 112 in its second position, inner front contact and armature of change-over relay 109, to ground at the inner front contact and armature of relay 115. The secondary motor magnet under the control of this circuit now advances the brushes of the connector brush one rotary step which brings the secondary brush 120 into engagement with contact 121. At the close of this series of impulses the change-over relay 109 will have its operating circuit opened and will thereby effect the release of the escape magnet 114 which advances side switch wipers into their third position, but this operation is of no effect at this time. However, a circuit is closed for release relay 122, extending from grounded battery, winding of this relay, conductor 123, contact 121, secondary brush 120, armature and back contact of relay 117, outer back contact and armature of change-over relay 109, to ground. The relay 122 is operated in this circuit and closes a locking circuit for itself through its right-hand front contact and armature to ground at the primary off-normal contacts. When the relay 122 is operated, the switching relay 103 has its circuits closed at the left-hand front contact and armature of relay 122. Relay 103 is operated in this circuit and closes a locking circuit for itself through its right-hand armature to the holding conductor 56. The release magnet 124 also has an operating circuit closed for itself at this time, at the left-hand armature and front contact of relay 122 and this magnet when energized effects the release of the connector switch. As soon as the release magnet 124 is energized it closes a circuit from ground, through its inner armature and front contact, back contact, continuity spring and winding of relay 117, to grounded battery. Relay 117 when operated is locked actuated in a circuit closed through its continuity spring and armature, through conductor 155, extending to the holding ground. The foregoing directive operation of the connector switch is for the purpose of determining whether the connector switch in its succeeding operations will be advanced to an odd or even group or level of terminals or to an odd or even terminal in the selected group or level.

The subscriber now transmits impulses corresponding to the second digit of the wanted number, which consists of two impulses corresponding to the digit "2." When the impulse relay 102 retracts its armatures in response to the first impulse of this series, a circuit is closed for the change-over relay 109, from grounded battery, winding of this relay, back contact and armature of relay 110, outer armature and back contact of relay 102, outer armature and front contact of relay 103, conductors 104 and 105, primary brush 106, side switch wiper 107 in its first position, to ground. The change-over relay is energized in this circuit and at its inner armature and front contact closes a multiple circuit for the primary motor magnet 111 extending through side switch wiper 112 in its first position. The primary motor magnet is operated in this circuit and interrupts its own circuit to advance the brushes of the connector switch in a vertical direction. This causes the brush 106 to engage the "0" contact and close a circuit from ground, through side switch wiper 107 in its first position, brush 106, "0" contact, conductor 128, inner front contact and armature of relay 103, back contact, continuity spring and winding of the impulse relay 102, over the impulse circuit including conductors 100 and 101 of the selected trunk, and the right-hand winding of the impulse relay, to grounded battery. The impulse relay is energized in this circuit and closes a locking circuit for itself through its continuity spring and armature. At the time when the energizing circuit of the impulse relay is closed, a circuit is completed for the primary motor magnet 111, through the side switch wiper 112 in its first position, front contact and armature of relay 109, outer armature and front contact of relay 102, over conductor 128, to ground. The primary motor magnet is energized in this circuit but immediately interrupts its own circuit and advances the connector switch brushes one step in the primary or vertical direction. It will thus be seen that the switch advances two steps in response to a single directive impulse. When the subscriber interrupts the impulse circuit to transmit the second and last impulse of this series, the impulse relay 102 retracts its armature and thereby completes the operating circuit for the primary motor magnet 111, now extending over conductor 104 and through the primary brush 106, to ground at the side switch wiper 107. The primary motor magnet is thus energized and causes the connector switch brushes to take an additional step. This completes a circuit for energizing the impulse relay 102 which circuit extends from ground at the side switch wiper 107, through the primary brush 106, through the No. 2 level or group contact, conductor 128, inner front contact and armature of relay 103, back contact, continuity spring and winding of impulse relay 102, over the remainder of the impulse circuit previously described as extending to grounded battery. With the impulse relay energized, a circuit is again closed for the primary motor magnet 111 now extending from grounded battery, winding back contact and armature of this magnet, side switch wiper 112 in its first position, front contact and armature of relay 109, outer armature and front contact of relay 102, inner armature and front contact of relay 103, conductor 128 in multiple with the circuit just described for the impulse relay. Under the control of this circuit the primary motor magnet advances the connector switch brushes an additional vertical step to the level designated #3.

At the close of this series of impulses the impulse relay 102 will retain its armatures attracted for a relatively long interval thereby interrupting the energizing circuit of the relay 109. This relay shortly afterwards opens the energizing circuit of the escape magnet 114 and this magnet advances the side switch wipers into their second position. In response to the impulses corresponding to the last digit of the wanted number which in the case assumed is 4, the impulse relay will again vibrate its armatures. In response to the first impulse of this series the impulse relay retracts its armatures and thereby completes a circuit for the change-over relay 109, extending from grounded battery, winding of this relay, outer back contact and armature of relay 110, outer back contact and armature of the impulse relay, outer armature and front contact of relay 103, conductor 104, primary brush 106 in engagement with the #3 group contact and the side switch wiper 107 to ground. The change-over relay 109 is energized in this circuit and at its inner armature and front contact closes a circuit in multiple with that just described through the side switch wiper 112 in its second position, armature, back contact and winding of the secondary motor magnet 119, to grounded battery. The secondary motor magnet interrupts its own circuit and advances the brushes of the connector one step in its rotary direction. This operation brings the secondary brush 120 into engagement with the terminal 125 and thereby closes a circuit from ground, through the side switch wiper 107, right-hand armature and continuity spring of relay 117, brush 120, terminal 125, conductor 130, armature and back contact of relay 127, conductor 128, inner front contact and armature of relay 103, back contact and armature of impulse relay, over the remainder of the impulse circuit previously described. The impulse relay 102 is energized in this circuit and attracts its armatures to complete an operating circuit for the secondary motor magnet 119. This circuit differs from that previously described in that it now extends from the back contact and armature of relay 110, through the armature and front contact of relay 102, inner armature and front contact of relay 103, to ground over conductor 128 and the remainder of the circuit previously described. In response to the second impulse of this series, the impulse relay 102 will retract its armatures and this will cause the motor magnet 119 to energize and interrupt its own circuit and thereby advance the connector switch brushes an additional step. As soon as this has been effected, a circuit will be completed through the secondary brush 120 and the terminal with which it is in engagement, to energize the impulse relay and also the secondary motor magnet to advance the connector switch brushes an additional step. It will thus be seen that in response to each of these directive impulses the secondary motor magnet advances the connector switch two steps and since there are four impulses transmitted in this last series the connector switch will be stepped eight steps in the rotary direction, thereupon bringing the connector switch brushes into engagement with the terminals allotted to line #124. At the close of this series of impulses the impulse relay 102 will attract its armatures for a relatively long period and thereby cause the change-over relay 109 to retract its armatures. Let it first be assumed that the wanted line is idle, under which assumption the test relay 110 will remain inert when the wanted line is tested and the escape magnet 114 will deenergize and move the side switch wipers into their third position. A circuit is now closed to energize the escape magnet 114, extending from grounded battery, resistance, winding of this magnet, outer right-hand back contact and armature of relay 113, outer right-hand armature and back contact of release magnet 124, to ground at the third position of side switch 107.

Ringing current is thereupon supplied to the wanted line from the source of ringing current indicated at GEN, through the windings of the trip relay 131, side switch wiper 132 in its third position, over the lower side of the wanted line and through the ringing at the wanted substation, through the side switch wiper 133, to ground. When the wanted party responds, trip relay 131 is operated and at its armature and front contact short-circuits the escape magnet 114 which deenergizes and advances the side switch wipers into their fourth or talking position.

Talking battery is supplied to the calling subscriber through the windings of the relay 102 while talking battery is supplied to the called subscriber through the windings of the relay 115.

In the event that the wanted line was busy at the time when it was tested by the test relay 110 with the side switch wipers in their second position, the test relay will be operated and locked in series with the escape magnet 114 in a circuit closed from grounded battery, through the resistance, winding of the escape magnet 114, back contact and armature of relay 113, continuity spring and contact of relay 109, winding of test relay 110, side switch wiper 134 in its second position and through a multiple test brush and a side switch wiper similar to 134 connected to ground at the connector switch which has previously seized the wanted line. Test relay 110 is energized in this circuit and through its armature and continuity spring closes a locking circuit for itself through the primary off-normal contacts 135, to ground. At the inner left-hand armature and front contact of the test relay, a source of busy tone current is supplied to the calling line in the well known manner. The escape magnet is also held operated in series with the test relay and thus prevents the application of ringing current to the wanted busy line.

Let it be assumed that the first digit of the wanted number was "2" in which case as soon as the trunk represented by the conductors 100 and 101 is seized, the connector switch brushes will be advanced one vertical step and the side switch wipers will be moved into their second position. In response to the two impulses corresponding to the digit "2" the secondary motor magnet 119 will be operated in the manner previously described in the case when the first digit was one and this magnet will advance the connector switch brushes until the rotary brush is in engagement with contact 136. This operation is effective as soon as the change-over relay 109 releases, to close a circuit from ground, armature and back contact of this relay, back contact and armature of relay 117, secondary brush 120, contact 136, conductor 137 and winding of relay 113, to grounded battery. Relay 113 when operated closes a locking circuit for itself over conductor 138. With relay 113 operated a circuit is closed for actuating the release magnet 124. This circuit extends through the left-hand armature and front contact of relay 113, to ground through the primary off-normal contacts 135. It will be noted that the relay 113 opens the circuit of the escape magnet 114 so that the side switch wipers will not be moved into position 2 when the shaft is operated in the manner now to be described. When the brush shaft of the connector switch reaches its normal position, a circuit is closed from ground, through side switch wiper 107, primary brush 106, conductors 105 and 104, inner back contact and armature of relay 103, outer front contact and armature of relay 102, armature and back contact of relay 110, winding of the change-over relay 109, to grounded battery. This relay attracts its armatures and thereby closes a multiple operating circuit for the primary motor magnet 111 and this magnet advances the brushes of the connector switch one vertical step. In this way a new starting point is effected for the connector switch. It will be remembered that when the first digit of the wanted number was one the starting point of the connector switch brushes at the close of this first series of impulses was the normal position of the switch. It will now be seen that as a result of the circuit last described the starting point for the connector switch brushes will now be at the zero point. When now the subscriber transmits impulses corresponding to the second digit of the wanted number, the impulse relay 102 will retract its armatures and thereby close a circuit from ground over the conductor 128 to step the connector switch to the level designated #1 and when the impulse circuit is again closed to energize the impulse relay it closes a circuit from ground over the conductor 105 to step the switch to the second level or group. At the first retraction of the impulse relay just described, the holding circuit of the relay 113 is broken and it deenergizes closing the circuit of the escape magnet and at the close of this series of impulses the escape magnet deenergizes and moves its side switch wipers into their second position.

If the first digit of the wanted number had been "3" the operation of setting the connector switch is the same as that described for the digit "1" except that the relays 103 and 127 will be energized. The relay 103 is effective to interchange the connection of the conductors extending to the controlling contacts of the connector switch so that the third digit will be effective to stop the brushes on an odd contact in the selected group or level. The second digit then causes the brushes to be advanced to an odd level the same as when the first digit of the number was "1." It will be noted that the first deenergization of the impulse relay closes a circuit from ground, over the vertical brush 106 and the odd conductor to step the brushes to the first contact and when the secondary brush 120 engages with its first contact the same circuit is effective to step the connector switch brushes to the second contact. When now the impulse relay energizes, the connector switch is advanced to the third contact. The next deenergization of the impulse relay causes, however, only one step to be taken by the connector switch.

In the event that the first digit of the wanted number had been "4," the operation for advancing the brushes of the connector switch to the wanted level is the same as for the digit "2," but in this case the relay 127 is energized and is effective to cause the impulses corresponding to the third digit of the wanted number to advance the brushes of the connector switch to a wanted contact in the selected group or level in the same manner as when the first digit of the wanted number was "3."

What I claim is:

1. In an automatic telephone system, an incoming circuit, a plurality of outgoing circuits, an automatic switch arranged for primary and secondary movements, means for originating impulses to control said switch, and means including a single motor magnet to advance said switch to one position directively and to a second position automatically in response to each impulse.

2. In an automatic telephone system, an incoming circuit, a plurality of outgoing circuits, means including an automatic switch for inter-connecting said incoming circuit with any of said outgoing circuits, a motor magnet for controlling the advance of said automatic switch, and circuits for alternately, directively and automatically controlling the operation of said motor magnet.

3. In a telephone system, an incoming circuit, a plurality of outgoing circuits, an automatic switch, and means including a motor magnet for advancing said automatic switch step-by-step to connect said incoming circuit with a desired outgoing circuit, said motor magnet being operated a plurality of steps in response to each impulse.

4. In an automatic telephone system, an incoming circuit, a plurality of outgoing circuits, an automatic switch for said incoming circuit, means for advancing said automatic switch step-by-step to a desired outgoing circuit, said means being directively operated a plurality of steps in response to each impulse, a plurality of starting points of the directive operations of said switch, and means for selectively determining the starting point of the directive operation of said switch.

5. In an automatic telephone system, an incoming circuit, a plurality of outgoing circuits, an automatic switch for interconnecting said incoming circuit and one of said outgoing circuits, said switch being provided with brushes in which the incoming circuit terminates and with terminals in which said outgoing circuits terminate, means for operating said switch, an impulse relay for controlling said means, an impulse circuit for said relay including two sides of said incoming circuit in series, a brush and a terminal of said switch, and a locking circuit for said impulse relay.

6. In an automatic telephone system, an incoming circuit, a plurality of outgoing circuits, an automatic switch for inter-connecting said incoming circuit and one of said outgoing circuits in response to directive impulses, said switch being provided with a brush in which said incoming circuit terminates and with terminals in which said outgoing circuits terminate, and impulse circuits over certain of which impulses are transmitted to said switch, one of said impulse circuits including two sides of said incoming circuit in series a brush and terminals of said switch, the other of said impulse circuits completed independently of said brush and terminals as a result of the completion of said first impulse circuit.

7. In an automatic telephone system, an incoming circuit, a plurality of outgoing circuits, an automatic switch for inter-connecting said incoming circuit with any of said outgoing circuits, said switch being provided with a series of terminals and a brush for engagement therewith, an impulse circuit for said switch, a pair of conductors multipled to alternate terminals of said series, and a relay for determining which of said conductors shall be included in said impulse circuit.

8. In an automatic telephone system, an incoming circuit, a plurality of outgoing circuits, an automatic switch for inter-connecting said incoming circuit with any of said outgoing circuits, a motor magnet for advancing said switch, an impulse relay remotely controlled from a distant point over said incoming circuit, said relay being provided with normally open and normally closed sets of contacts and circuits for said motor magnet extending through said sets of contacts.

9. In an automatic telephone system, an incoming circuit provided with a dial sender, a plurality of outgoing circuits, an automatic switch for inter-connecting said incoming circuit with any of said outgoing circuits, means for operating said switch, an impulse relay for controlling said means, a dial sender controlled impulse circuit for said relay including two sides of said incoming circuit in series, and a locking circuit for said relay co-operating in the control thereof.

10. In an automatic telephone system, an incoming circuit, a plurality of outgoing circuits, an automatic switch for inter-connecting said incoming circuit with any of said outgoing circuits, said automatic switch being provided with a brush and contacts, means for operating said switch, an impulse relay for controlling said means, an impulse circuit for said relay including two sides of said incoming circuit, said brush and certain of said contacts in series, a locking circuit for said relay co-operating in the control thereof, said locking circuit including a portion of the previously described circuit, and a subscriber's dial sender for interrupting said locking circuit.

11. In an automatic telephone system, an incoming circuit, a plurality of outgoing circuits, an automatic switch for inter-connecting said incoming circuit with any of said outgoing circuits, said switch being provided with brushes in which the incoming line terminates and with terminals in certain of which said outgoing lines terminate, means for operating said switch, an impulse relay for controlling said means, an impulse circuit for said relay including two sides of said incoming circuit in series, a brush and a terminal of said switch, a locking circuit for said relay completed on its energization, and means including a subscriber's dial sender for interrupting said locking circuits.

12. In an automatic telephone system, an incoming circuit, an automatic switch provided with group and line contacts and with brushes to engage said contacts, outgoing circuits terminating in certain of said contacts, and impulse circuits for advancing said switch to interconnect said incoming circuit with any of said outgoing circuits, said impulse circuits extending in different positions of said switch through its group and line contacts.

13. In an automatic telephone system, an incoming circuit, a plurality of outgoing circuits, an automatic switch arranged to be directively operated through group and line selecting movements to interconnect said incoming circuit with a wanted outgoing circuit, mechanism for effecting the group and line selecting movements of said automatic switch, means controlled over said incoming circuit for directively advancing the mechanism of said automatic switch and for subsequently releasing the same, and means effected by said first mentioned means for qualifying the group and line selecting movements of said automatic switch.

14. In an automatic telephone system, an incoming circuit associated with an impulse transmitter, a plurality of outgoing lines arranged in groups, an automatic switch directively operable into association with a group of lines and subsequently to be operated into engagement with a desired line of the selected group, mechanism for advancing said automatic switch through its group and line selecting movements, releasing mechanism for said switch, means controlled by said impulse transmitter over an incoming circuit for directively operating said mechanism in its primary movements, means responsive to the primary switch operation for operating said release mechanism, means for subsequently actuating said operating mechanism of the switch under the control of said impulse transmittter, and means controlled by said release mechanism for qualifying the subsequent directive control of said impulse transmitter.

15. In an automatic telephone system, an incoming circuit, a plurality of outgoing circuits arranged on a non-decimal basis, an automatic switch to interconnect said incoming circuit with any of said outgoing circuits, an impulse sender associated with said incoming circuit for transmitting impulses on a decimal basis, means responsive to said impulse sender for directively advancing said automatic switch, means thereupon effective for releasing said automatic switch, and translating means controlled by the advance and subsequently release of said automatic switch for subsequently advancing said switch under the control of said impulse sender to cause said switch to select lines on a nondecimal basis.

16. In an automatic telephone system, an incoming circuit, a plurality of outgoing circuits arranged in groups, an automatic switch, a primary motor magnet for advancing said switch to a wanted group, a secondary motor magnet for advancing said switch to select an outgoing circuit in the selected group, said automatic switch being provided with brushes and with a set of contacts for each line terminating in the switch, and means including operating circuits for said primary and said secondary motor magnets extending through certain brushes and contacts of said automatic switch.

17. In an automatic telephone system, an incoming circuit, a plurality of outgoing circuits, a progressively movable automatic switch for interconnecting said incoming circuit with any of said outgoing circuits, an impulse circuit including said incoming circuit and a pair of conductors arranged to be interchangeably included in said impulse circuit depending upon the character of the primary movement of said primary switch.

In witness whereof, I hereunto subscribe my name this 9th day of February, A. D. 1921.

WINFRED T. POWELL.